(12) United States Patent
Glagolenko et al.

(10) Patent No.: US 7,927,566 B2
(45) Date of Patent: Apr. 19, 2011

(54) EXTRACTION OF RADIONUCLIDES BY CROWN ETHER-CONTAINING EXTRACTANTS

(75) Inventors: Jury Vasilievich Glagolenko, Ozersk (RU); Mikhail Vasilievich Logunov, Ozersk (RU); Igor Vitalievich Mamakin, Moscow (RU); Vladimir Mikhailovich Polosin, Moscow (RU); Sergey Ivanovich Rovny, Ozersk (RU); Vadim Alexandrovich Starchenko, Sankt-Petersburg (RU); Jury Pavlovich Shishelov, Moscow (RU); Nikolay Gennadievich Yakovlev, Ozersk (RU)

(73) Assignees: Designing-Contructing and Industrial-Inculcating Enterprise "Daymos Ltd.", St. Petersburg (RU); Federal State Institute "Federal Agency for Legal Protection of Military Special and Dual Use, Intellectual Activity Results" under Ministry of Justice of the Russian Federation (FSI "FALPIAR"), Moscow (RU)

( * ) Notice: Subject to any disclaimer, the term of this patent is extended or adjusted under 35 U.S.C. 154(b) by 920 days.

(21) Appl. No.: 11/574,825

(22) PCT Filed: Sep. 9, 2004

(86) PCT No.: PCT/RU2004/000348
§ 371 (c)(1),
(2), (4) Date: Jul. 26, 2007

(87) PCT Pub. No.: WO2006/036083
PCT Pub. Date: Apr. 6, 2006

(65) Prior Publication Data
US 2008/0014133 A1    Jan. 17, 2008

(51) Int. Cl.
*C01F 13/00* (2006.01)
(52) U.S. Cl. .................. 423/2; 423/6; 423/8; 423/155; 423/157; 423/179; 423/181; 210/682; 588/20
(58) Field of Classification Search .............. 423/2, 6, 423/8, 155, 157, 179, 181; 210/682; 588/20
See application file for complete search history.

(56) References Cited

U.S. PATENT DOCUMENTS

| | | | |
|---|---|---|---|
| 4,749,518 | A | 6/1988 | Davis, Jr. et al. |
| 5,085,834 | A | 2/1992 | Lemaire et al. |
| 5,100,585 | A | 3/1992 | Horwitz et al. |
| 5,169,609 | A | 12/1992 | Horwitz et al. |
| 5,344,624 | A | 9/1994 | Foos et al. |
| 5,702,608 | A | 12/1997 | Foos et al. |
| 5,888,398 | A | 3/1999 | Dietz et al. |
| 6,174,503 | B1 | 1/2001 | Moyer et al. |
| 2001/0029810 | A1 | 10/2001 | Ho |

FOREIGN PATENT DOCUMENTS

| | | | |
|---|---|---|---|
| DE | 32 19004 C1 | | 3/1984 |
| FR | 2656149 | | 6/1991 |
| FR | 2700709 | | 1/1993 |
| FR | 2707416 | | 1/1995 |
| JP | 2003227028 | A * | 8/2003 |
| RU | 1768216 | A1 | 10/1992 |
| RU | 1695547 | | 7/1994 |
| SU | 1693438 | A1 | 11/1991 |
| SU | 170661 | A1 | 1/1992 |
| WO | WO 94/17530 | | 8/1994 |

* cited by examiner

*Primary Examiner* — Jerry Lorengo
*Assistant Examiner* — Pritesh Darji
(74) *Attorney, Agent, or Firm* — Locke Lord Bissell & Liddell LLP

(57) ABSTRACT

The present invention relates to a treatment of high-level waste of radiochemical production containing radionuclides and macro-admixtures including sodium. The method of extraction of radionuclides by processing acidic aqueous waste solutions by extractants containing macrocyclic compounds selected from the group of crown ethers having aromatic fragments containing alkyl and/or hydroxyalkyl substituents of a linear and/or branched structure, and/or cyclohexane fragments containing alkyl and/or hydroxyalkyl substituents of a linear and/or branched structure, and/or fragments of —O—CHR—$CH_2$O—, where R is the normal or branched alkyl or hydroxyalkyl in organic solvents containing polyfluorinated telomeric alcohol 1,1,7-trihydrododecafluoroheptanol-1 having the formula $H(CF_2CF_2)nCH_2OH$, where n=3, and a mixture of polyoxyethylene glycol ethers of synthetic primary higher aliphatic alcohols of a fraction $C_{12}$-$C_{14}$ of a general formula $CnH2_{n+1}O(C_2H_4O)mH$, where n=12-14, m=2 is proposed. A possibility of selection of quantitative and qualitative composition of the extractant depending on the waste composition and the object to be achieved of joint or individual extraction of radionuclides results in universal technology. A method of regeneration of extractants containing crown ethers allowing one to carry out the operation of extraction of radionuclides in a commercial scale under countercurrent dynamic conditions, with regeneration of the extractant for reuse is also proposed.

28 Claims, No Drawings

EXTRACTION OF RADIONUCLIDES BY CROWN ETHER-CONTAINING EXTRACTANTS

This is a U.S. national phase application under 35 U.S.C. §371 of international application PCT/RU2004/000348, filed Sep. 9, 2004, which designated the United States of America and which is hereby incorporated by reference in its entirety. PCT/RU2004/000348 which is hereby incorporated by reference in its entirety published as WO 2006/036083 A1 which is entitled Extraction Of Radionuclides By Crown Ether-Containing Extractants.

TECHNICAL FIELD

The present invention relates to processing and fractionation of liquid radioactive waste of radiochemical production, in particular, it related to technologies of extraction, purification and concentration of radionuclides, for example, strontium and cesium from a high-level liquid waste when processing irradiated nuclear fuel.

BACKGROUND OF THE INVENTION

The concept of a closed fuel cycle in nuclear power stations provides disposal of all radioactive waste while obtaining products suitable for long-term storage or burial, for example, radionuclides in a bonded condition in hardened materials or suitable for using their radioactivity in future, for example, as isotope products.

The basic mass of radionuclides after regeneration of irradiated nuclear fuel is in the form of high-level liquid waste, which, alongside with a high contents of stable macro admixtures—sodium, aluminum, iron, rare-earth and other elements in an amount of up to 300 g/l, contain a small amount of radionuclides of cesium, strontium and transuranium elements.

To reduce the volumes of hardened materials to be buried but containing radionuclides with a different degree of activity, for example, presently used borosilicate or phosphatic glasses, it is necessary to increase the specific activity of radionuclides in the glass volume. The specific activity of solutions used for solidification and subsequent burial, can be increased by reducing the amount of salts in the solutions of radionuclides or by adding saltless fractions of strontium and cesium radionuclides to the solutions of radionuclides to be buried.

At the present time, the most advanced method of fractionating liquid radioactive waste based on extraction of radionuclides including strontium and cesium radionuclides can be realized in two ways.

One of them is based on application of polyhedral carborane complex, in which cobalt dicarbolide chloride (DCC) is used as complexing agent for extraction of cesium, while strontium is extracted using high-molecular polyethylene glycols dissolved in fluorinated nitroaromatic solvent. However, this technology has significant disadvantages involved in a necessity of preliminary adjustment of a starting solution, high losses of extractants in the process of isolation of refined products and isolation of the target products, and a high cost of extractant and latent solvent.

Another way is associated with a possibility of using complexing agents consisting of macrocyclic polyethers or crown ethers of a different structure having unique selectivity to radionuclides including that to ions of strontium-90 and cesium-137 with a wide range of applicable solvents of crown ethers for creation of extraction mixtures.

However, practical application of crown ethers is rather limited due to low solubility of crown ethers themselves, particularly those containing benzene substituents in organic solvents and high solubility of crown ethers and their complexes in aqueous solutions.

In order to increase the solubility of crown ethers in organic solvents and to decrease their solubility in aqueous solutions, macrocyclic compounds were synthesized from a group of crown ethers having aromatic fragments, containing alkyl and/or hydroxyalkyl substituents of a linear and/or branched structure, and/or cyclohexane fragments containing alkyl and/or hydroxyalkyl substituents of a linear and/or branched structure, and/or fragments of —O—CHR—CH2O—, where R is the normal or branched alkyl or hydroxyalkyl.

The most wide-spread structures include: bis(tert-butyl-benzo)-18-crown-6 (DTBDB18C6), di-isooctylbenzo-18-crown-6 (DIODB18C6), dibenzo-21-crown-7 (DB21C7), bis-4,4'(5')[1-hydroxy-2-ethylhexyl]benzo-18-crown-6 (CROWN XVII), bis(tert-butylcyclohexane-18-crown-6 (DTBDCH18C6), di-isooxyldicyclohexane-18-crown-6 (DIODCH18C6), bicyclohexane-18-crown-6 (DCH18C6), 6ис-4,4'(5')[1-hydroxyheptyl]cyclohexo-18-crown-6 (CROWN XVI), dibenzo-18-crown-6 (DB18C6), dibenzo-24-crown-8 (DB24C8), dibenzo-30-crown-10 (DB30C10). Except for DB18C6, DB21C7, DB24C8 and DB30C10, all listed crown ethers have higher solubility in organic, especially, paraffin, solvents and smaller losses at water-organic contacts preserving, according to the published data, high selectivity to cations of radionuclides being extracted.

Known in the art are methods of extraction of cesium from aqueous solutions containing other ions by means of extraction mixtures based on crown ethers bis-4,4'(5')-(hydroxyalkyl-benzo)-18-crown-6 in an organic solvent containing tri-n-butyl phosphate or methyl isobutyl ketone with subsequent contact of the obtained organic solution with a solution of an inorganic acid (U.S. Pat. No. 5,888,398, A).

Known in the art are methods of extraction of cesium from aqueous alkaline waste also containing a considerable amount of other ions of alkali metals such as sodium and potassium using extraction mixtures based on calixarene crown ethers in a neutral hydrocarbon solvent, for example, crown ether calix [4]arene-(bis-tert-octylbenzo-crown-6) ether in aliphatic kerosene (U.S. Pat. No. 6,174,503, B1).

Known in the art is a method of selective extraction of cesium-135 by an extraction mixture containing a crown-ether tert-butyl benzo-21-crown-7 (TBB21C7) and sodium tetraphenyl borate (FR, 2700709, A1).

Also known in the art is an extraction mixture for extraction of cesium from aqueous nitrate mediums containing a crown ether dibenzo-21-crown-7 in a concentration of 0.1-0.2 mole/l in an organic dissolvent 2,2-dihydrotrifluoroethylene pentafluoroethyl ether (SU, 1693438, A1).

Known in the art are methods of consecutive extraction of cesium and strontium from acidic solutions of a radioactive waste: cesium extrantant, consisting mainly of crown ethers bis-4,4'(5')[1-hydroxy-2-ethylhexyl]benzo-18-crown-6 (subsequently referred to as Crown XVII) with liquid cation-exchange dinonylnaphthalene sulfuric acid or didodecyl-naphthalene didodecylnaphthalene sulfonic acid, and extraction of strontium by an extrantant consisting mainly of a crown ether bis-4,4'(5')[1-hydroxyheptyl]cyclohexo-18-crown-6 (subsequently referred to as Crown XVI) with the same cation exchangers in a matrix solution containing tributyl phosphate and kerosene (U.S. Pat. No. 4,749,518, A). A disadvantage of this method of joint extraction of strontium and cesium is a low distribution ratio of strontium and cesium in the process of extraction and isolation of radionuclides because of a low radiation resistance of the extraction mixture components.

Known in the art is a method of isolation of strontium, neptunium, americium and plutonium from aqueous nitrate solutions by an extraction mixture containing a crown ether, for example, 4,4'(5')[R, R']bicyclohexane-18-crown-6, where R and R' are selected from the group including methyl, propyl, isobutyl, t-butyl, hexyl, heptyl, and n-octyl(phenyl)-N,N-diisobutylcarbamoyl phosphine oxide in a solvent selected from the group containing normal paraffin hydrocarbons and isoparaffin hydrocarbons (U.S. Pat. No. 5,169,609, A).

However a common disadvantage of the above-described methods is a low radiation resistance of the extractants in a continuous extraction cycle.

Also known in the art are methods of extraction of radionuclides including strontium-90, cesium-135 and cesium-137 with the help of extractants containing crown ethers with various solvents and resistant to radiation.

For example, a method is known, which is used for extraction of metals, such as plutonium, uranium and strontium, from aqueous solutions using cis-sin-cis isomer of crown ether bicyclohexane-18-crown-6 (DCH18C6) in an organic solvent such as nitrobenzene or ethylene dichloride, or in a solid phase such as silicon (FR, 2656149, A).

Known in the art is a method of neutralization of radioactive nitrate solutions containing strontium and sodium in a concentration of 0.01 to 0.2 mole/l with the help of a mixture containing crown ether bicyclohexane-18-crown-6 (DCH18C6) and a solvent, such as chloroform $CHCl_3$, 1,1,2,2-tetrachloroethane, dichloromethane, nitrobenzene, brombenzene placed in cation-exchange resin (FR, 2707416, A1).

However, the application of said extraction mixtures and solvents, though has shown high radiation resistance of the extractants and distribution ratios of strontium and cesium acceptable for industrial use, still has not eliminated considerable losses of crown ethers due to their washing off in the process of re-extraction of radionuclides by aqueous solutions.

DISCLOSURE OF THE INVENTION

An object of the invention is to develop extractants and methods of extraction of radionuclides including strontium and/or cesium from a high-level liquid waste of radiochemical processes also containing others macro-admixtures, in particular, sodium having a strong effect on the extraction characteristics of liquid extractants. In the process of elaboration of the present invention a task was set up to provide extractants containing complexing agents having high selective capacity when attaching radionuclides, for example, cations of cesium and strontium, and low interactivity with other ions contained in high-level waste, for example, sodium in an organic solvent capable of retaining in water-organic contacts components of extractants and associates with ions of radionuclides being extracted, for example, cesium and/or strontium, preventing their washing-off with effluents. A task was also set up to develop a method of effective regeneration of the extractant for reuse in the process.

The inventors are aware on application of polyfluorinated telomeric alcohol 1,1,7-trihydrododecafluoroheptanol-1 as a component of a reaction medium in production of fluoropolymers and also on a method of extraction of radionuclides strontium from a nitrate waste of nuclear power stations by an extraction mixture containing a solution of bicyclohexyl-18-crown-6 (DCH18C6) in an organic solvent—a mixture of telomeric alcohol 1,1,7-trihydrododecafluoroheptanol-1 and 2,4-diethyloctanol, said method comprising the steps of contacting the waste with an extraction mixture, washing of the extract and re-extraction of strontium with distilled water (SU, 1706661. A1). In so doing the contents of crown ether in the extractant was 0.1-0.2 mole/l in a mixture of a solvent with about 60-65% of 1,1,7-trihydrododecafluoroheptanol-1 and 40-35% of 2,4-diethyloctanol.

The object of the invention was attained by using polyfluorinated telomeric alcohol 1,1,7-trihydrododecafluorobeptanol-1 having a formula: $H(CF_2CF_2)nCH_2OH$, where n=3 (subsequently referred to as fluoroheptanol $n_3$) as a solvent of solutions containing macrocyclic compounds selected from the group of crown ethers having aromatic fragments containing alkyl and/or hydroxyalkyl substituents of a linear and/or branched structure, and/or cyclohexane fragments containing alkyl and/or hydroxyalkyl substituents of a linear and/or branched structure, and/or fragments of —O—CHR—$CH_2O$—, where R is the normal or branched alkyl or hydroxyalkyl.

The object of the invention was attained by developing an extractant for extraction of radionuclides from acidic aqueous solutions of high-level waste of radiochemical production also containing others macro-admixtures including sodium containing macrocyclic compound capable of attaching ions of radionuclides in an organic solvent, in which the macrocyclic compound is selected from the group of crown ethers having aromatic fragments containing alkyl and/or hydroxyalkyl substituents of a linear and/or branched structure, and/or cyclohexane fragments containing alkyl and/or hydroxyalkyl substituents of a linear and/or branched structure, and/or fragments of —O—CHR—$CH_2O$—, where R is the normal or branched alkyl or hydroxyalkyl, and the organic solvent contains polyfluorinated telomeric alcohol 1,1,7-trihydrododecafluoroheptanol-1.

Furthermore, according to the invention, the organic solvent in the extractant may further comprise a mixture of polyoxyethylene glycol ethers of synthetic primary higher aliphatic alcohols of a fraction $C_{12}$-$C_{14}$ of a general formula: $C_nH_{2n+1}O(C_2H_4O)mH$, where n=12-14, m=2.

In so doing it is expedient that the organic solvent in the extractant has the following amount of components, % by volume:

| | |
|---|---|
| polyfluorinated telomeric alcohol 1,1,7-trihydrododecafluoroheptanol-1 | 80-99, |
| a mixture of polyoxyethylene glycol ethers of synthetic primary higher aliphatic alcohols of a fraction $C_{12}$-$C_{14}$ | 20-1. |

Besides, according to the invention, the extractant can be adapted to extraction of radionuclides of cesium from waste containing cations of cesium, and may contain crown ether selected from the group including bis(tert-butylbenzo)-18-crown-6 (DTBDB18C6), di-isooctylbenzo-18-crown-6 (DIODB18C6), dibenzo-21-crown-7 (DB21C7), bis-4,4'(5')[1-hydroxy-2-ethylhexyl]benzo-18-crown-6 (Crown XVII).

In so doing, according to the invention, it is expedient that the extractant for extraction of radionuclides of cesium containing crown ether dibenzo-21-crown-7 in a concentration of about 0.04 mol/l to 0.1 mol/l of extractant.

Besides, according to the invention, the extractant can be adapted to extraction of radionuclides of strontium from waste containing strontium cations and contain a crown ether selected from the group including bis(tert-butylcyclohexane- 18-crown-6 (DTBDCH18C6), di-isooxyldicyclohexane-18-crown-6 (DIODCH18C6), bicyclohexane-18-crown-6 (DCH18C6), bis-4,4'(5')[1-hydroxyheptyl]cyclohexo-18-crown-6 (Crown XVI).

In so doing, according to the invention, it is expedient that the extractant for extraction of strontium radionuclides contains a crown ether bicyclohexane-18-crown-6 in a concentration of about 0.04 mol/l to 0.1 mol/l extractant.

Besides, according to the invention, the extractant can be adapted to joint extraction of strontium and cesium radionuclides from waste containing strontium and cesium cations, said extractant containing a mixture of crown ethers, in which at least one crown ether is selected from the group including bis(tert-butylbenzo)-18-crown-6 (DTBDB18C6), di-isooctylbenzo-18-crown-6 (DIODB18C6), dibenzo-21-crown-7 (DB21C7), bis-4,4'(5')[1-hydroxy-2-ethylhexyl]benzo-18-crown-6 (CROWN XVII), and at least one crown ether is selected from the group including bis(tert-butylcyclohexane-18-crown-6 (DTBDCH18C6), di-isooxyldicyclohexane-18-crown-6 (DIODCH18C6), bicyclohexane-18-crown-6 (DCH18C6), bis-4,4'(5')[1-hydroxyheptyl]cyclohexo-18-crown-6 (CROWN XVI).

In so doing, according to the invention, it is preferable that the organic solvent had the following amount of components, % by volume:

| | |
|---|---|
| polyfluorinated telomeric alcohol 1,1,7-trihydrododecafluoroheptanol-1 | 87, |
| a mixture of polyoxyethylene glycol ethers of synthetic primary higher aliphatic alcohols of a fraction $C_{12}$-$C_{14}$ | 13. |

In so doing, according to the invention, it is expedient that the extractant for joint extraction of cesium and strontium contains a mixture of crown ethers such as bicyclohexyl-18-crown-6 and dibenzo-21-crown-7.

In so doing, according to the invention, it is expedient that in said extractant the concentration of each crown ether is about of 0.04 mol/l to 0.1 mol/l of the extractant.

The object of the invention was also attained by developing a method of regeneration of used extractant containing complexes of a macrocyclic compound selected from the group of crown ethers having aromatic fragments containing alkyl and/or hydroxyalkyl substituents of a linear and/or branched structure, and/or cyclohexane fragments containing alkyl and/or hydroxyalkyl substituents of a linear and/or branched structure, and/or fragments of —O—CHR—CH$_2$O—, where R is the normal or branched alkyl or hydroxyalkyl with extractable cations in an organic solvent containing polyfluorinated telomeric alcohol 1,1,7-trihydrododecafluoroheptanol-1 by processing the used extractant with an aqueous solution of potassium ethylenediamine-tetraacetate at pH from about 8.0 to 9.0.

In so doing, according to the invention, it is preferable that the concentration of potassium ethylenediamine-tetraacetate in an aqueous solution is selected in a range of about 0.02 mol/l to 0.03 mol/l.

In so doing, according to the invention, it is reasonable to maintain said pH by adding potassium hydroxide.

The object of the invention was also attained by providing a method of extraction of radionuclides from an acidic aqueous solution of high-level waste of radiochemical production containing other macro-admixtures including sodium, said method comprising the steps of processing aqueous solution of a waste extrantant containing macrocyclic compounds capable of attaching ions of radionuclides and selected from the group of crown ethers having aromatic fragments containing alkyl and/or hydroxyalkyl substituents of a linear, and/or branched structure, and/or cyclohexane fragments containing alkyl and/or hydroxyalkyl substituents of a linear and/or branched structure, and/or fragments of —O—CHR—CH$_2$O—, where R is the normal or branched alkyl or hydroxyalkyl in an organic solvent containing polyfluorinated telomeric alcohol 1,1,7-trihydrododecafluoroheptanol-1 with formation of an extract with subsequent re-extraction of radionuclides from the extract by deionized water.

In so doing, according to the invention, the organic solvent for solving the extractant may further comprise a mixture of polyoxyethylene glycol ethers of synthetic primary higher aliphatic alcohols of a fraction $C_{12}$-$C_{14}$ (subsequently referred to as synthanol).

In so doing, according to the invention, it is expedient that the organic solvent extractant had the following amount of components, % by volume:

| | |
|---|---|
| polyfluorinated telomeric alcohol 1,1,7-trihydrododecafluoroheptanol-1 | 80-99, |
| a mixture of polyoxyethylene glycol ethers of synthetic primary higher aliphatic alcohols of a fraction $C_{12}$-$C_{14}$ | 20-1. |

Besides, according to the invention, the claimed method of extraction can be adapted to extraction of cesium radionuclides, and the extractant may contain a crown ether selected from the group including bis(tert-butylbenzo)-18-crown-6 (DTBDB18C6), di-isooctylbenzo-18-crown-6 (DIODB18C6), dibenzo-21-crown-7 (DB21C7), bis-4,4'(5')[1-hydroxy-2-ethylhexyl]benzo-18-crown-6 (CROWN XVII).

In so doing, according to the invention, it is expedient that the extractant contains dibenzo-21-crown-7 at a concentration about of 0.04 mol/l to 0.1 mol/l of the extractant.

Besides, according to the invention, the method of extraction can be adapted to extraction of strontium radionuclides, and extractant may contain a crown ether selected from the group including bis(tert-butylcyclohexane-18-crown-6 (DTBDCH18C6), di-isooxyldicyclohexane-18-crown-6 (DIODCH18C6), bicyclohexane-18-crown-6 (DCH18C6), bis-4,4'(5')[1-hydroxyheptyl]cyclohexo-18-crown-6 (CROWN XVI).

In so doing, according to the invention, it is expedient that in the method of extraction of strontium radionuclides the extractant contains bicyclohexane-18-crown-6 in a concentration about of 0.04 mol/l to 0.1 mol/l of the extractant.

Besides, according to the invention, the method of extraction of radionuclides can be adapted to joint extraction of radionuclides of both cesium and strontium, and the extractant may contain a mixture of crown ethers, in which at least one crown ether is selected from the group including bis(tert-butylbenzo)-18-crown-6 (DTBDB18C6), di-isooctylbenzo-18-crown-6 (DIODB18C6), dibenzo-21-crown-7 (DB21C7), bis-4,4'(5')[1-hydroxy-2-ethylhexyl]benzo-18-crown-6 (CROWN XVII), and at least one crown ether is selected from the group including bis(tert-butylcyclohexane-18-crown-6 (DTBDCH18C6), di-isooxyldicyclohexane-18-crown-6 (DIODCH18C6), bicyclohexane-18-crown-6 (DCH18C6), bis-4,4'(5')[1-hydroxyheptyl]cyclohexo-18-crown-6 (CROWN XVI).

In so doing, according to the invention, it is preferable that the organic solvent has the following amount of components, % by volume:

| polyfluorinated telomeric alcohol 1,1-7-trihydrododecafluoroheptanol | 87, |
|---|---|
| a mixture of polyoxyethylene glycol ethers of synthetic primary higher aliphatic alcohols of a fraction $C_{12}$-$C_{14}$ | 13. |

In so doing, according to the invention, it is expedient that the extractant contains a mixture of bicyclohexyl-18-crown-6 and dibenzo-21-crown-7.

In so doing, according to the invention, it is expedient that the concentration of each crown ether in the mixture is about of 0.04 mol/l to 0.1 mol/l of the extractant.

The object of the invention was also attained by providing a method of extraction of radionuclides according to the invention, which has an additional step of isolation of the reused extractant and its regeneration for utilization by processing with an aqueous solution of potassium ethylenediamine-tetraacetate at pH about of 8.0 to 9.0.

In so doing, according to the invention, it is expedient that the concentration of potassium ethylenediamine-tetraacetate in the aqueous solution is selected in a range of about 0.02 mol/l to 0.03 mol/l.

In so doing, according to the invention, it is acceptable that pH of the solution is provided by adding potassium hydroxide.

Besides, according to the invention, all steps of the methods of extraction of radionuclides are carried out under countercurrent dynamic conditions.

THE BEST EMBODIMENT OF THE INVENTION

The invention is further described on concrete examples of its realization. In the description of concrete embodiments use is made of a particular terminology, however the invention is not limited to the accepted terms and it should be understood that each such term covers all equivalent terms used for achieving the same result.

1. Selectivity of the Extractants According to the Invention to Extraction of Radionuclides.

1.1. Selectivity of the Extractants Based on Crown Ethers in Different Solvents.

Study was carried out for determining the distribution ratios of radionuclides, for example, strontium or cesium to be extracted by the extractants according to the invention containing various crown ethers as a complexing agent: bis(tert-butylbenzo)-18-crown-6 (subsequently referred to as DTBDB18C6), di-isooctylbenzo-18-crown-6 (subsequently referred to as DIODB18C6), bis(tert-butylcyclohexane-18-crown-6 (subsequently referred to as DTBDCH18C6), di-isooxyldicyclohexane-18-crown-6 (subsequently referred to as DIODCH18C6), bicyclohexane-18-crown-6 (subsequently referred to as DCH18C6) or dibenzo-21-crown-7 (subsequently referred to as DB21C7), in an organic solvent according to the invention: polyfluorinated telomeric alcohol 1,1,7-trihydrododecafluoroheptanol-1 (subsequently referred to as fluoroheptanol $n_3$).

For comparison, the distribution ratios of strontium and cesium were determined using extractants containing similar crown ethers in another organic solvent (decane).

Taken for the tests were experimental aqueous nitrate solutions containing strontium and cesium in a concentration of 1 g/l with a content of nitric acid of about 3.0 mol/l.

The obtained distribution ratios of strontium and cesium for different extraction systems No. 1-12 are presented in Table 1.

TABLE 1

Distribution ratios of strontium and cesium extracted in organic solutions of crown ethers

| Crown ether, 0.1 mole/l | System No. | Solvent | Distribution ratio | | Remarks |
|---|---|---|---|---|---|
| | | | Strontium | Cesium | |
| DTBDB18C6 | 1 | Decane | — | — | Gel in an organic фазе |
| | 2 | Fluoroheptanol $n_3$ | 0.11 | 15.45 | |
| DIODB18C6 | 3 | Decane | 0.05 | 0.004 | |
| | 4 | Fluoroheptanol $n_3$ | 0.06 | 4.23 | |
| DTBDCH18C6 | 5 | Decane | <0.001 | — | |
| | 6 | Fluoroheptanol $n_3$ | 1.91 | — | |
| DIODCH18C6 | 7 | Decane | <0.001 | 0.004 | |
| | 8 | Fluoroheptanol $n_3$ | 0.106 | — | |
| DCH18C6 | 9 | Decane | — | — | The third phase |
| | 10 | Fluoroheptanol $n_3$ | 1.6 | — | |
| DB21C7 | 11 | Decane | — | — | Is insoluble |
| | 12 | Fluoroheptanol $n_3$ | — | 10.7 | |

From the data of Table 1 it follows that the use of extraction systems with crown ethers in paraffin hydrocarbons such as decane is practically impossible due to low distribution ratios of strontium and cesium.

The size of the alkyl chain has a considerable effect on the extraction characteristics of crown ethers, probably arising steric difficulties in placement of a cation in a macrocycle space. The distribution ratios of strontium for organic solutions DCH18C6 (system No. 10) and DTBDCH18C6 (system No. 6) in Fluoroheptanol $n_3$ have approximately the same values (1.91 and 1.6), but with an increasing number of carbon atoms in the joint radical, for example, up to the isooctyl radiacal (system No. 8), reduces them by more than an order of magnitude.

The extraction of cesium using extractants containing derivatives of dibenzo-crown-ethers is effective only in Fluoroheptanol $n_3$. In so doing it should also be noted that, when increasing the number of atoms of carbon in the substituent alkyl chain, the distribution ratios of cesium determined in identical conditions of experiment (system No. 2 and system No. 4) are reduced considerably.

1.2. Solubility of Extractants Based on Crown Ethers at Acid and Water-Organic Contacts.

The study of solubility of extractants according to the invention and the extractants containing similar crown ethers in other solvents in aqueous and nitrate solutions was carried out.

Taken for the tests were crown ethers containing DCH18C6 or DB21C7 in a concentration of about 0.1 mole/l in different organic solvents. The extractants were mixed with aqueous or nitrate solutions with a content of nitric acid 3 mole/l in a closed thermostatically controlled chamber for 3 hours. Then the obtained water-organic systems were separated. The aqueous part after settling down and filtering was analyzed for a content of crown ethers using photometric measurements. The test results are given in Table 2.

TABLE 2

Solubility of crown ethers in water and in nitric acid when used as extractants with different organic solvents

| | | Concentration of crown ether in an aqueous phase, mol/l × $10^{-3}$ | | | | |
|---|---|---|---|---|---|---|
| | | DTSG18K6 | | DE21K7 | | |
| No. | Solvent | $HNO_3$ | $H_2O$ | $HNO_3$ | $H_2O$ | Remarks |
| 1 | Tetrachloroethane | 0.139 | 0.258 | 0.159 | 0.173 | |
| 2 | Trichlorethylene | 0.94 | 0.65 | 0.218 | 0.188 | |
| 3 | Tetrachloropropane | 1.72 | 0.968 | — | — | Insoluble |
| 4 | Trichlorobenzene | 2.016 | 1.142 | 0.173 | 0.168 | |
| 5 | 2,2-dihydrotrifluoroethyl pentafluoroethyl ether | 0.344 | 0.301 | 0.112 | 0.071 | |
| 6 | Fluoroheptanol $n_3$ | 0.086 | <0.027 | 0.068 | <0.025 | |

The test results presented in Table 2 have shown that the minimum solubility of crown ethers in aqueous and nitrate solutions is observed in extractants based on crown ethers in Fluoroheptanol $n_3$ according to the invention.

1.3 Selectivity of Extractants According to the Invention Depending on Composition of Waste to be Processed.

The differences in the compositions of high-level waste solutions influencing the selectivity of the extractants according to the invention were studied.

1.3.1. Determination of Components of Solutions Influencing the Extraction of Radionuclides.

The composition of real starting solutions 1 and 2 from radiochemical production subjected to extraction of radionuclides was determined. In so doing experimental solution 1 was a simulator of the evaporated refined product of processing fuel cells used in Russia, and solution 2 was a simulator of high-level liquid waste used in the INEEL (USA). The averaged composition is presented in Table 3.

TABLE 3

Averaged composition of high-level waste

| | | Element concentration, g/l | |
|---|---|---|---|
| No. | Element name | Solution No. 1 | Solution No. 2 |
| 1 | Na | 10.0 | 33.12 |
| 2 | K | 0.2 | 7.43 |
| 3 | Cs | 0.7 | $5.2 \times 10^{-3}$ |
| 4 | Mg | 0.2 | — |
| 5 | Ca | 1.0 | 2.6 |
| 6 | Sr | 0.5 | $5.7 \times 10^{-3}$ |
| 7 | Ba | 0.3 | — |
| 8 | Al | 7.0 | 20.25 |
| 9 | Rare-earth | up to 20.0 | — |
| 10 | Si | 0.02 | — |
| 11 | Zr | 0.2 | 0.9 |
| 12 | Pb | 0.2 | 0.17 |
| 13 | Cr | 1.0 | 0.26 |
| 14 | Mn | 1.5 | — |
| 15 | Fe | 5.0 | 1.17 |
| 16 | Ni | 2.0 | 0.1 |
| 17 | Mo | 0.2 | 0.048 |
| 18 | $HNO_3$ | 120 | 102 |

From Table 3 it is evident that the maim difference of compositions of solutions No. 1 and No. 2, which can influence the processes of extraction of radionuclides, is a high concentration of macro-admixtures, such as sodium and potassium, on a background of low concentration of extracted elements.

1.3.2. Determination of Concentration of Nitric Acid in a Starting Solution Influencing the Extraction of Sodium by the Extractants According to the Invention.

Selected for study were extractants containing crown ethers: DB18C6, DTBDB18C6, DCH18C6 or DB21C7 in a concentration of about 0.1 mol/l in Fluoroheptanol $n_3$. Used as experimental solutions were aqueous solutions of sodium nitrate whose concentration was determined using radiometric techniques on previously added aliquot of a sodium-22 isotope. The test results are given in Table 4.

TABLE 4

Influence of concentration of nitric acid on extraction of sodium with the extractants according to the invention

| Concentration of nitric acid, mol/l | Distribution ratios of sodium | | | |
|---|---|---|---|---|
| | DB18C6 + Fluoroheptanol $n_3$ | DTBDB18C6 + Fluoroheptanol $n_3$ | DCH18C6 + Fluoroheptanol $n_3$ | DB21C7 + Fluoroheptanol $n_3$ |
| 0 | 0.025 | 0.03 | 0.1 | 0 |
| 0.1 | 0.04 | 0.04 | 0.12 | 0 |
| 0.5 | 0.15 | 0.17 | 0.12 | 0.005 |
| 1.0 | 0.21 | 0.27 | 0.05 | 0.01 |
| 3.0 | 0.49 | 0.55 | 0.02 | 0.1 |
| 5.0 | 0.67 | 0.64 | 0.01 | 0.12 |

From Table 4 it follows that extractants containing crown ethers DB18C6 and DTBDB18C6 have minimum distribution ratios of sodium in solutions with concentration of nitric acid from about 0 to 0.1 mol/l, thereafter the extraction of sodium increases. Extractant containing DB21C7 in a range of concentrations of nitric acid from 0 to about 0.1 mol/l practically does not extract sodium, and at higher concentration of nitric acid extracts sodium insignificantly. Extractant containing DCH18C6 with a low concentration of nitric acid from 0 to 0.5 mol/l has low distribution ratios of sodium, and with an increase of concentration of nitric acid in the starting solution above 0.5 mol/l the extraction of sodium practically drops down to zero.

1.3.3. Determination of Concentration of Sodium Influencing the Extraction of Radionuclides by the Extractants According to the Invention.

Extraction of cesium was made involving starting solutions containing 1 g/l of cesium in nitric acid having concentration about of 3.0 mol/l at different concentration of sodium. The solutions were treated with the extractants according to the invention containing crown ether DTBDB18C6 in a concentration about of 0.1 mol/l in fluoroheptanol $n_3$. The test results are given in Table 5.

TABLE 5

Influence of concentration of sodium on extraction of cesium with the extrantant according to the invention

| Experience No. | Concentration of sodium nitrate in starting solution, mole/l | Cesium distribution ratio |
|---|---|---|
| 1 | 0 | 16.0 |
| 2 | 0.02 | 9.0 |
| 3 | 0.03 | 9.1 |
| 4 | 0.04 | 9.3 |
| 5 | 0.20 | 3.0 |

From the data of Table 5 it is evident that even insignificant concentration of sodium nitrate in a starting solution reduces the distribution ratios of cesium, occupying the extractant space.

The characteristics of the extractants according to the invention in the process of extraction of sodium from acidic aqueous solutions of high-level waste were determined. For this purpose, the concentration of sodium in the organic and aqueous phases containing extractants based on DTBDB18C6 or DCH18C6 or DB21C7 in a concentration about of 0.05 mol/l in fluoroheptanol $n_3$ were analyzed. The results are given in Table 6.

TABLE 6

Interaction extractants according to the invention with sodium

| Test No. | Extractant | Sodium concentration, mol/l | |
|---|---|---|---|
| | | in the organic phase | in the aqueous phase |
| 1 | DTBDB18C6 + | 0 | 0.01 |
| 2 | Fluoroheptanol | 0.035 | 0.1 |
| 3 | $n_3$ | 0.07 | 0.2 |
| 4 | | 0.14 | 0.4 |
| 5 | DCH18C6 + | 0 | 0.01 |
| 6 | Fluoroheptanol | 0.003 | 0.1 |
| 7 | $n_3$ | 0.005 | 0.2 |
| 8 | | 0.009 | 0.4 |
| 9 | DB21C7 + | 0 | 0.01 |
| 10 | Fluoroheptanol | 0.01 | 0.1 |
| 11 | $n_3$ | 0.018 | 0.2 |
| 12 | | 0.035 | 0.4 |

Studying Table 6 one may come to a conclusion that the extractants according to the invention based on non-alkylated crown ethers DCH18C6 and DB21C7 have lower distribution ratios of sodium compared to the extrantant containing non-alkylated crown ether DTBDB18C6. This property is important for selection of extractants for extraction of radionuclides from a high-level waste containing sodium in a considerable amounts, for example, from strong solutions with a sodium concentration of about 0.4 mol/l that corresponds to sodium concentration of about 10 g/l and higher while preserving free space for a complexing agent sufficient for extraction radionuclides as well.

1.3.4. Determination of Concentration of Nitric Acid Influencing the Extraction of Radionuclides from Waste Solutions.

The dependence of extraction of cesium by organic solutions DTBDB18C6 in fluoropentanol $n_3$ and DB21C7 in Fluoroheptanol $n_3$ at a concentration of nitric acid in a starting solution was studied. Solution No. 1 whose composition is listed in Table 2 was used as a starting solution. The results of this study are given in Table 7.

TABLE 7

Influence of concentration of nitric acid on selective capacity of the extractants according to the invention

| Test No. | Concentration of nitric acid, mol/l | Distribution ratios of cesium | |
|---|---|---|---|
| | | DTBDB18C6 + Fluoroheptanol $n_3$ | DB21C7 + Fluoroheptanol $n_3$ |
| 1 | 0 | 2.5 | 0.25 |
| 2 | 0.1 | 7.1 | 1.0 |
| 3 | 0.5 | 12.8 | 3.2 |
| 4 | 1.0 | 12.3 | 7.8 |
| 5 | 2.0 | 10.3 | 10.2 |
| 6 | 3.0 | 8.2 | 12.2 |
| 7 | 4.0 | 6.0 | 11.4 |
| 8 | 5.0 | 4.0 | 10.0 |
| 9 | 6.0 | 2.7 | 8.0 |
| 10 | 7.0 | 1.1 | 6.2 |
| 11 | 8.0 | 0 | 5.0 |

From the results given in Table 7 it is obvious that the extractant according to the invention containing DTBDB18C6 in Fluoroheptanol $n_3$ has, starting from the pH-th areas, in neutral, weak and slightly acidic medium distribution ratios of cesium sufficient for performing a countercurrent dynamic process of cesium extraction, and maximum extraction characteristics are obtained at a concentration of nitric acid in a range about of 0.3 to 1.5 mol/l, therefore, the claimed extrantant can extract cesium from neutral media including waste, contour, sump, drain and many other effluents.

The extractant according to the invention containing DB21C7 in fluoropentanol $n_3$ in solutions with concentration of nitric acid from 0 to about 0.7 mol/l has poor extraction characteristics, and the best selectivity in cesium extraction manifests at concentration of nitric acid in a range about of 2.0 to 5.0 mol/l with a maximum at a level about of 3.0 mol/l.

2. Selective Capacity of the Extractants According to the Invention in Comparison with Prior Art Extractants Based on Crown XVI and Crown XVII.

A process of extraction of cations of different metals from aqueous nitrate solutions was studied by processing them using the extractants according to the invention containing DCH18C6 or DB21C7 in an organic solvent comprising: Fluoroheptanol $n_3$—80% by volume and synthanol—20% by volume at a concentration of crown ethers of 0.05 mol/l and a content of nitric acid about of 190 g/l. For comparison, the data were used given in a patent specification (U.S. Pat. No. 4,749,518, A) describing similar tests of extractants containing Crown XVI or Crown XVII with a cation exchanger—dinanylnaphthalene sulfonic acid in a matrix solution containing tributyl phosphate and kerosene.

The solutions were contacted with the extractants according to the invention in temperature-controlled (25±30° C.) separating funnels for 5 minutes at a ratio of organic and aqueous phases of 1:1. After settling within 60 minutes, the phases were separated, and the aqueous phase was analyzed to determine the concentration of the elements. The distribution ratios calculated by the results of the analyses of the corresponding elements are given in Table 8.

From the data given in Table 8, one may come to a conclusion that the characteristics of extraction of strontium and cesium ensured by the claimed and known methods differ insignificantly.

3. Selection of a Range of Concentration of Crown Ether in the Extractants According to the Invention.

We have studied the selective capacity of the extractants according to the invention containing a mixture of crown ethers DCH18C6 and DB21C7, each being in a different concentration, in an organic solvent containing: % by volume:

| | |
|---|---|
| Fluoroheptanol $n_3$ | 87, |
| Synthanol | 13, | depending on the concentration of the crown ether, when extracting strontium and cesium radionuclides.

The aqueous solutions strontium and cesium, each element having concentration of 1 g/l and concentration of nitric acid of 3.0 mol/l with preliminarily added aliquots of strontium-85 and cesium-34 were contacted with the above-mentioned extractants in separating funnels at a temperature of 25±30° C. for 5 minutes at a ratio of organic and aqueous phases of 1:1. After settling within 60 minutes the phases were separated, and the aqueous phase was analyzed. The concentration of strontium and cesium in the aqueous solutions were determined by the radiometric method. The obtained results are illustrated in Table 9.

TABLE 9

Influence of concentration of crown ethers on the extraction characteristics of the extractants according to the invention Concentration of each of crown ethers: DCH18C6

TABLE 8

Extraction and cations of different metals

| Composition | Initial Concentration, g/l | Distribution ratios | | | |
|---|---|---|---|---|---|
| | | Extractant based on DCH18C6 | *Extractant based on Crown XVI | Extractant based on DB21C7 | *Extractant Based on Crown XVII |
| Al | 6.0 | 0.03 | — | 0.02 | — |
| Ba | 1.0 | 2.03 | 4.2 | 1.02 | 0.03 |
| Fe | 10.0 | 0.017 | — | 0.014 | — |
| Y | 1.0 | — | 0.02 | — | 0.02 |
| Ca | 2.0 | 0.12 | — | 0.02 | — |
| Mn | 0.4 | 0.06 | — | 0.04 | — |
| Ni | 4.0 | 0.023 | — | 0.03 | — |
| Pd | 0.3 | — | 0.05 | 0.03 | 0.22 |
| Ru | 0.75 | 0.16 | 0.26 | 0.004 | 0.31 |
| Rare-earth | 25.0 | 0.04 | 0.06 | 0.04 | 0.17 |
| Rb | 0.12 | — | 0.11 | 0.02 | 0.29 |
| Pb | 0.05 | 4.2 | | 0.02 | — |
| Sr | 1.0 | 3.6 | 3.84 | 0.02 | 0.06 |
| Cr | 1.0 | 0.02 | | 0.02 | — |
| Cs | 1.0 | 0.02 | 0.03 | 1.8 | 1.59 |
| Zr | 1.0 | 0.018 | 1.41 | 0.038 | 2.09 |
| Na | 10.0 | 0.01 | — | 0.047 | — |

*As described in US patent 4749518, A.

| and DB21C7 in extractant, | Distribution ratios | |
|---|---|---|
| mol/l | Strontium | Cesium |
| 0.04 | 1.65 | 1.16 |
| 0.05 | 2.32 | 2.32 |
| 0.06 | 2.99 | 3.47 |
| 0.07 | 3.66 | 4.64 |
| 0.08 | 4.33 | 5.79 |
| 0.09 | 5.0 | 6.95 |
| 0.1 | 5.67 | 8.11 |

From the results presented in Table 9 we may come to a conclusion that in the whole range of concentrations of crown ethers the extractants according to the invention effectively extracts strontium and cesium, and the individual concentrations of crown ethers can be selected depending on a composition of an aqueous solution to be processed.

4. Determination of Optimal Concentration of Synthanol in the Extractant According to the Invention.

We studied the selectivity of the extractants according to the invention containing a mixture of crown ethers DCH18C6 and DB21C7, each being in a concentration about of 0.05 mol/l, in an organic solvent containing Fluoroheptanol $n_3$ and Synthanol depending on a quantitative ratio in a solvent.

An aqueous nitrate solution having a composition similar to that described above with preliminarily added aliquots of strontium-85 and cesium-134 were contacted with said extrantant in separating funnels at a temperature about of 25±3° C. for 5 minutes at a ratio of the organic and aqueous phases 1:1. After settling within 60 minutes of the phases were separated, and the aqueous phase was analyzed. The concentration of strontium and cesium in the aqueous solutions was determined by the radiometric method. The obtained results are presented in Table 10.

TABLE 10

Extraction of radionuclides depending on the synthanol concentration in the extractant according to the invention

| Concentration of synthanol | Distribution ratio | |
|---|---|---|
| in a solvent, % by volume | Strontium | Cesium |
| 5 | 1.26 | 2.80 |
| 10 | 1.80 | 2.56 |
| 15 | 2.69 | 2.16 |
| 20 | 3.10 | 1.79 |

From Table 10 it is obvious that an increase of the concentration of synthanol in an organic solvent of the extractant according to the invention positively affects the extraction of strontium, and negatively affects the extraction of cesium.

From the graphic comparison of the results of the extraction we may come to a conclusion that for the claimed extractants for joint extraction of strontium and cesium the optimal concentration of Synthanol in a solvent containing Fluoroheptanol $n_3$, is equal to 13% by volume.

5. Radiation Resistance of the Extractants According to the Invention.

The radiation resistance of the extractants according to the invention used for extraction radionuclides of strontium or cesium was studied. For this purpose, reaction mixtures consisting of biphase water-organic systems containing extractants based on crown ethers DCH18C6 or DB21C7 in Fluoroheptanol $n_3$ and aqueous nitrate waste solutions, and, for comparison, reaction mixtures containing extractants based on crown ethers Crown XVI or Crown XVII with a cation exchanger—dinanylnaphthalene of sulfonic acids in a matrix solution comprising tributyl phosphate and kerosene were irradiated with gamma-rays $C^{60}$ in a temperature-controlled cell of stainless steel with continuous agitation by bubbling. The maximum integrated radiation dose was equal to 285.3 kGr. The extractant samples were tested and the extraction characteristics were measured before and after the irradiation to determine a decrease of the distribution ratio $D_{Me}$ due to the radiological destruction of extractant components. The obtained results are given in Table 11.

TABLE 11

Radiation resistance of the extractants according to the invention

| | | | | After irradiation by a dose | | | |
|---|---|---|---|---|---|---|---|
| | | | | 100.0 kGr ($10^7$ rad) | | 285.3 kGr | |
| No. | Crown ether extractant | Radionuclide to be extracted | Before irradiation | $D_{Me}$ | % of original | $D_{Me}$ | % of original |
| 1 | DCH18C6 | Sr | 3.6 | 3.4 | 94.4 | 3.0 | 83.3 |
| 2 | Crown XVI | Sr | 1.98 | 1.56 | 78.78 | — | |
| 3 | DB21C7 | Cs | 2.83 | 2.83 | 100.0 | 2.65 | 93.8 |
| 4 | Crown XVII | Cs | 1.59 | 1.04 | 65.41 | — | |

From results shown in Table 11 it is obvious that after irradiation by a dose of 100 kGr the extractant based on Crown XVI loses about 21% of the distribution ratio of strontium, and the extractant based on Crown XVII reduces the distribution ratio of cesium by 35%. After irradiation by a dose of 285.3 kGr the extractants based on Crown XVI and Crown XVII are practically useless. The loss of the distribution ratios of strontium and cesium in the extractants according to the invention after irradiation by a dose of 100 kGr is insignificant, and the extractants remain efficient even after irradiation by a dose considerably exceeding 100 kGr.

6. Regeneration of the Extractants According to the Invention.

Owing to the fact that crown ethers are expensive products, a possibility of regeneration of extractants containing crown ethers was studied for the purpose of their reuse.

To obtain extractant according to the invention, 23.64 g of crown ether DB21C7 (0.06 mol/l) and 29.8 g of DCH18C6 (0.08 mol/l) were solved in succession in one liter of an organic solvent according to the invention containing 13% by volume of synthanol and 87% by volume of fluoroheptanol $n_3$; the obtained organic phase of extractant was kept for one hour and cooled. Then the following operations were performed in succession:

an organic phase was brought in contact with a starting aqueous solution, whose composition for solution No. 1 is given in Table 3; after settling, the phases were separated;

an aqueous phase (refined solution) was analyzed, and the organic phase was mixed in succession with deionized water (two contacts) to isolate aqueous re-extracts for analysis of the elements to be extracted and an organic phase-reused extractant;

reused extractant was contacted to an aqueous solution of potassium ethylenediamine-tetraacetate (subsequently referred to as EDATA (K) with concentration of 0.025 mol/l (one contact) at pH from about 8.0 to 9.0 potassium hydroxide in the solution.

The conditions of contact, separation and analysis of phases are similar to those described in paragraph 4. The distribution ratios were calculated using the results of the phase analysis of cations of metals are given in Table 12.

TABLE 12

Regeneration of the extractant according to the invention, when effecting the method of extraction of radionuclides according to the invention

| No. of contact | Aqueous phase composition | Distribution ratios of elements | | | |
|---|---|---|---|---|---|
| | | Cesium | Strontium | Barium | Lead |
| 1 | Starting solution | 2.6 | 2.8 | 2.2 | 4.15 |
| 2 | Water | 0.8 | 0.7 | 0.6 | 4.22 |
| 3 | Water | 0.24 | 0.13 | 0.11 | 4.21 |
| 4 | EDATA (K) + Potassium hydroxide to pH of the solution from about 8.0 to 9.0 | 0.05 | 0.01 | 0.01 | 0.11 |

From Table 12 it is obvious that the extraction, washing and re-extraction of cesium, strontium and barium with water takes place with satisfactory distribution ratios. The contact of the reused extractant with EDATA (K) allows one to completely restore the complexing agent of the extractant according to the invention for subsequent use, and this is an important factor for organization of a cyclic dynamic technological process of extraction of radionuclides from an organic phase by the method according to the invention. Since lead is not re-extracted by water, it must be extracted from the reused extractant by means of regeneration, where a potassium salt of ethylenediamine-tetraacetic acid can be used as an aqueous phase.

From above it follows that the extractants according to the invention containing crown ethers capable of extracting radionuclides and selected from the group of crown ethers having aromatic fragments containing alkyl and/or hydroxyalkyl substituents of a linear and/or branched structure, and/or cyclohexane fragments containing alkyl and/or hydroxyalkyl substituents of a linear and/or branched structure, and/or the fragments of —O—CHR—CH$_2$O—, where R is the normal or branched alkyl or hydroxyalkyl, in polyfluorinated telomeric alcohol 1,1,7-trihydrododecafluoroheptanol-1 or in an organic solvent containing polyfluorinated telomeric alcohol 1,1,7-trihydrododecafluoroheptanol-1 and a mixture polyoxyethylene glycol ethers of synthetic primary higher aliphatic alcohols of a fraction $C_{12}$-$C_{14}$ have the following properties:

high extraction performance with respect to radionuclides, for example, strontium or cesium weakly dependent on the acidity and elemental composition of the macroadmixtures of a starting solution;

resistance to irradiation;

the solvent used in the extractants allows one to obtain concentrations of crown ethers required for effective extraction of strontium and cesium, while retaining both crown ethers and their associates with the cations being extracted during contacts with aqueous solutions and nitric acid solutions, which can be used for re-extraction of radionuclides;

a possibility of regeneration of the used extractant according to the invention for subsequent reuse that allows one to apply the extractants according to the invention repeatedly under dynamic industrial conditions.

From above it also follows that, as it is illustrated by the above examples of effecting the methods of extraction of radionuclides of strontium and/or cesium from aqueous acidic solutions of high-level waste by means of the extractants according to the invention, it is possible to carry out an optimum selection of quantitative and qualitative composition of complexing agents and a solvent of the extractant according to the invention for fulfilling concrete tasks of extraction of radionuclides from mediums having different contents of macroadmixtures including sodium of different acidity and different composition of radioactive elements.

7. Extraction of Radionuclides from Acidic Aqueous Solutions of Radiochemical Production According to the Invention with the Help of the Extractants According to the Invention Under Industrial Conditions.

The specialists working in the field of processing of high-level waste of radiochemical production know that in the well known process of their fractionation using extractants containing chlorinated cobalt dicarbolide (DCC), the possibilities of extraction of cesium from solutions containing high concentration of elements of the I-III groups are limited. Due to low selectivity of DCC, starting solutions are diluted practically twice, thus increasing the volume of secondary radioactive waste. Extractants based on DCC demonstrate maximum distribution ratios at concentration of nitric acid about of 2.0 mol/l to 4.0 mol/l. The solution for re-extraction of cesium for an extractant with DCC is a solution of hydrazine in nitric acid with concentration about of 3.0 mol/l to 8.0 mol/l. To meet the requirements of fire and explosion safety in the processes of evaporation and glazing, the content of hydrazine in the processed solutions must not exceed 1.0 g/l so that the obtained re-extracts must be diluted prior to their glazing.

Using DCC, several versions of technological schemes are proposed: joint extraction of strontium and cesium with subsequent separate re-extraction by a hydrazine solution in nitric acid or a complex scheme of extraction of all radionuclides within one extraction cycle. In so doing the extractant makes use of one complexing agent—DCC, which extracts cesium with rather high distribution ratios, but has low selectivity since it extracts other elements as well. Individual isolation of strontium with the help of DCC is impossible.

A possibility of using in industry a method of extraction of radionuclides including strontium and cesium with the extractants containing crown ethers was restrained by high solubility of crown ethers and their complexes with extracted cations in aqueous solutions. Many experiments using chlorinated hydrocarbons, tributyl phosphate in paraffins and other solvents of crown ethers have not allowed the researchers to create industrial-scale technology of extraction of radionuclides using crown ethers.

In this case, any method of extraction of radionuclides includes operations of contacting the extractant with processable solutions, isolation of an extract containing an organic phase saturated with extracted cations and an aqueous phase, washing the organic phase to remove admixtures and subsequent re-extraction, jointly or separately, of radionuclides using water or solutions of different complexons.

According to the invention, an additionally operation of regeneration of used extractant can also be performed.

The inventors have developed methods of extraction of radionuclides with application of extractants according to the invention allowing the operations to be carried out under dynamic industrial conditions.

7.1. Method of Extraction of Strontium According to the Invention in a Dynamic Mode.

A starting aqueous solution whose composition and concentration of the components are given in Table 3 for a solution No. 1 was contacted with the extractant according to the invention containing 0.05 mole/l of DCH18C6 in a solvent containing 20% by volume of synthanol and 80% by volume of Fluoroheptanol $n_3$ in a continuous countercurrent process on a facility with extractors such as "mixer-settler" devices with impulse agitation and phase transportation. The extraction included eight steps of extraction, two washing steps, eight re-extraction steps and two steps of regeneration of the reused extractant. The compositions and flow rate of the components of the extraction process are given in Table 13.

TABLE 13

Composition and flow rate of components

| Component of the extraction scheme | Flow rate, ml/hour | Composition |
|---|---|---|
| Starting solution | 57.3 | See Table 3, solution No. 1, |
| Extractant | 59.0 | 0.05 mol/l of DCH18C6 + solvent: Synthanol - 20% by volume of Fluoroheptanol $n_3$ - 80% by volume |
| Washing solution | 5.66 | Deionized water |
| Re-extraction solution | 33.3 | Deionized water |
| Reclaiming solution | 5.66 | 0.025 mole/l aqueous solution of potassium ethylenediamine-tetraacetate + potassium hydroxide to pH from about 8.0 to 9.0 |

When running the facility, radiometric monitoring devices were used to control the concentration of strontium in the refined products, re-extracts and reclaims, as well as the concentration of the crown ethers in the extracted products. The technological characteristics of the process and solubility of the crown ether (averaged values) are given in Table 14.

TABLE 14

Extraction of strontium by the method according to the invention

| Products of extraction | Contents of strontium in the extracted products, in percent of the feedstock* | Concentration of crown ether in the extracted products, Mg/l |
|---|---|---|
| Refined product | 0.35 | 80 |
| Re-extract | 99.55 | 172 |
| Reclaim | <0.1 | 30 |

*With an account of the product flow rates

From the data of Table 14 it is evident that the efficiency of the extraction of strontium exceeds 99%. The average concentrating factor of about 1.7 times is obtained. The residual elements are completely extracted by the reclaiming solution, and this allows the reused extractant to be returned to the work cycle and to make the process continuous. Insignificant loss of the organic phase with aqueous products being processed allows one to conduct a continuous process without correcting the composition of the organic phase of the extractant according to the invention.

7.2. Method of Extraction of Cesium According to the Invention Under Dynamic Conditions.

The scheme of the process and the conditions of extraction of cesium by the method according to the invention are similar to those described above in 7.1, but the organic phase for extraction of cesium includes solutions DB21C7 in a concentration of about 0.05 mol/l in an organic solvent containing synthanol in an amount of 5% by volume and Fluoroheptanol $n_3$ in an amount of about 95% by volume. The compositions and flow rates of the extraction components of are listed in Table 15.

TABLE 15

Composition and flow rates of the components

| Component of the extraction process | Flow rate, ml/hour | Composition |
|---|---|---|
| Starting solution | 57.3 | See example 7.1, |
| Extractant | 59.0 | 0.05 mol/l of DB21C7 + solvent: Synthanol - 5% by volume and Fluoroheptanol $n_3$ - 95% by volume |
| Washing solution | 5.66 | Deionized water |
| Re-extracting solution | 33.3 | Deionized water |
| Reclaiming solution | 11.32 | 0.025 mol/l of aqueous solution of potassium ethylenediamine-tetraacetate + potassium hydroxide with pH from about 8.0 to 9.0 |

During the operation of the experimental facility radiometric monitoring devices were used to control the concentration of strontium in the refined products, re-extracts and reclaims, as well as the concentration of the crown ethers in the extracted products. The technological characteristics of the process and solubility of the crown ether (averaged values of several experiments) are given in Table 16.

TABLE 16

Extraction of cesium by the method according to the invention

| Products of extraction | Content of cesium in the extracted products in percent of the feedstock* | Concentration of the crown ether in the extracted products Mg/l |
|---|---|---|
| Refined product | 1.35 | 27 |
| Re-extract | 94.5 | 53 |
| Reclaim | 4.15 | 18 |

*With account of the of the product flow rates

From the data of Table 16 it is evident that the extraction of cesium is higher that 98% at a cesium yield of about 95% in a saltless product. The reclaimed extractant having no cesium can be returned in the work cycle with minimum losses.

7.3. Method of Joint Extraction of Strontium and Cesium According to the Invention Under Dynamic Conditions from the Waste of Russian Radiochemical Plants.

The feedstock consisting of a solution of a radioactive waste composition is specified in Table 3 as solution No. 1.

The process scheme and the extraction conditions are similar to those stated in 7.1, but the extractant consisted of a mixture of about 0.06 mol/l of DB21C7 with 0.08 mol/l of DCH18C6 in a solvent containing synthanol (13% by volume) and Fluoroheptanol $n_3$ (87% by volume). The compositions and flow rates of extracted components are given in Table 17.

TABLE 17

Composition and flow rate of components

| Product | Flow rate, ml/hour | Composition |
| --- | --- | --- |
| Starting solution | 57.3 | The same as the solution of example 7.1 |
| Extractant | 59.0 | 0.06 mol/l of DB21C7 + 0.08 mol/l of DCH18C6 + solvent: Synthanol - 13% by volume and Fluoroheptanol $n_3$ - 87% by volume |
| Washing solution | 5.66 | Deionized water |
| Re-extracting solution | 33.3 | Deionized water |
| Reclaiming solution | 5.66 | 0.025 mol/l of aqueous solution of potassium ethylenediamine-tetraacetate + potassium hydroxide with pH of about 8.0 to 9.0 |

When running the experimental facility, the concentration of strontium and cesium in the refined products, re-extracts and reclaims, as well as the concentration of crown ethers in the extracted products were controlled. The technological characteristics of the process and the solubility of the crown ethers (average values of several experiments) are given in Table 18.

TABLE 18

Extraction of cesium and strontium from the Russian radiochemical plants waste with the method according to the invention

| Products of extraction | Contents in the extracted products in percent of the feedstock* | | Concentration of the crown ether in the extracted products, Mg/l |
| --- | --- | --- | --- |
| | Cesium | Strontium | |
| Refined product | 1.63 | 1.87 | 180 |
| Re-extract | 95.1 | 97.4 | 152 |
| Reclaim | 3.2 | 0.7 | 70 |

*With account of the of the product flow rates.

From the results given in Table 18 it is evident that the joint extraction of strontium and cesium exceeds 98% at an average concentrating of about 1.7 times at a yield of a final product equal to 95-97%. The residual elements are completely extracted by the reclaiming solution thereby allowing one to return the reused extractant to the work cycle and to make the process continuous. The study of the extraction mixture composition after 50 cycles of the extractant turnover have shown that the insignificant loss of the organic phase with aqueous products allows one to carry out a long continuous processes without adjusting the composition of the organic phase of the extractant according to the invention.

7.4. Method of Joint Extraction of Strontium and Cesium from Waste of Radiochemical Production of INEEL (USA) Under Dynamic Conditions According to the Invention The starting aqueous solution simulated the waste of the INEEL (Idaho, USA) whose composition is given in Table 19. This solution was put in contact with the extrantant according to the invention containing a mixture of DB21C7 with concentration about of 0.1 mol/l and DCH18C6 with concentration about of 0.1 mol/l in a solvent containing Fluoroheptanol $n_3$ in a continuous countercurrent mode on the facility of extractors such as "mixer settler" with impulse agitation and phase transportation.

TABLE 19

Starting solution composition

| Element | Concentration mol/l | g/l | Element | Concentration mol/l | g/l |
| --- | --- | --- | --- | --- | --- |
| Al | 0.75 | 20.25 | K | 0.19 | 7.43 |
| B | 0.03 | 0.32 | Na | 1.44 | 33.12 |
| Cd | 0.0038 | 0.43 | Zr | 0.01 | 0.9 |
| Ca | 0.065 | 2.6 | Sr | $1.7 \times 10^{-4}$ | $4.8 \times 10^{-3}$ |
| Cr | 0.005 | 0.26 | Cs | $7.5 \times 10^{-5}$ | $9.97 \times 10^{-3}$ |
| Fe | 0.021 | 1.17 | Ni | $1.7 \times 10^{-3}$ | 0.1 |
| Hg | 0.004 | 0.8 | Mn | $1.4 \times 10^{-3}$ | 0.1 |
| Pb | $1.45 \times 10^{-3}$ | 0.17 | $HNO_3$ | 1.63 | 103 |

The extraction process includes eight steps of extraction, two steps of washing, ten steps of re-extraction and four steps of regeneration of the reused extractant. The compositions and product flow rates are given in Table 20.

TABLE 20

Composition and flow rate of components

| Extraction scheme component | Flow rate, ml/hour | Composition |
| --- | --- | --- |
| Starting solution | 57.3 | See Table 19. |
| Extractant | 59.0 | DB21C7 in a concentration about of 0.1 mol/l + DCH18C6 in a concentration about of 0.1 mol/l in a solvent - Fluoroheptanol $n_3$ - 100% by volume |
| Washing solution | 5.66 | Deionized water |
| Re-extracting solution | 33.3 | Deionized water |
| Reclaiming solution | 33.3 | 0.025 mole/l of aqueous solution of potassium ethylenediamine-tetraacetate + potassium hydroxide with pH of up to 8 |

During the operation of the experimental facility the concentration of strontium and cesium in the refined products, re-extracts and reclaims, as well as the concentration of the crown ethers in the extracted products were controlled. The technological characteristics of the process and solubility of the crown ethers (average values of several experiments) are given in Table 21.

TABLE 21

Extraction of strontium and cesium from production waste of the INEEL, USA

| Extraction product | Contents in the extracted products in percent of the feedstock* | | Concentration of crown ether in extracted products Mg/l |
| --- | --- | --- | --- |
| | Cesium | Strontium | |
| Refined product | 1.93 | 1.88 | 36 |
| Re-extract | 94.87 | 94.42 | 19 |
| Reclaim | 3.2 | 3.7 | 11 |

*With account of the of the product flow rates

From Table 21 it is evident that the joint extraction of strontium and cesium exceeds 98% at average concentrating of about 1.2 times and a yield of about 95% in the final product. The loss of the extractant with aqueous solutions in the given process is minimal.

From the results of testing the method it has been found that:

the application of the extractant according to the invention containing a mixture of crown ethers DB21C7 and DCH18C6 allows one to extract more than 98% of strontium and cesium per one extraction cycle, the concentration of strontium is higher than 1.8 times, the obtained saltless aqueous re-extracts contain less than 0.1 mol/l of nitric acid, the extractant loss was less than 1.0 mls per liter of the processed solution.

Thus, we have developed extractants based on crown ethers having high selectivity to radionuclides, and methods of extraction of radionuclides from acidic aqueous solutions of high-level waste of radiochemical production containing macro-admixtures including sodium in a considerable amount.

To advantages of the methods of extraction of radionuclides according to the invention also include:

a possibility of processing liquid radioactive waste of any composition without pretreatment, a possibility of re-extraction of radionuclides by aqueous solutions and, as a consequence, a possibility of direct transfer of re-extracts into a glazing furnace for increasing the glass specific activity, versatility of the methods according to the invention, since they can be used for joint production of strontium-cesium re-extracta or separated re-extracts both in one technological scheme and in separate technological schemes using individual extractants.

Experimental measurement of thermal stability of the extractants in a mixture with nitric acid of a different concentration have shown that the operations of extraction and re-extraction, as well as subsequent evaporation of the aqueous extracted products of the extraction scheme are explosion- and fireproof.

A possibility of application of fluoroheptanol $n_3$ as a solvent of macrocyclic compounds, for example, crown ethers capable of retaining crown ethers and their associates with extracted ions has allowed us to develop different extractants for extraction, for example, radionuclides, and methods of their extraction being safe and practically feasible.

The economic advantages of application of the extractants according to the invention based on crown ethers consist in that it is possible to reduce the cost of crown ethers due to their regeneration, saving of hydrazine and nitric acid, as well as saving of the extractant itself due to small losses of the extractant components at aqueous contacts.

INDUSTRIAL APPLICABILITY

Extractants according to the invention are obtained using well known technologies. The methods of regeneration of extractants for subsequent refuse and methods of extraction of radionuclides according to the invention with application of the extractants according to the invention can be realized in different industrial processes by selecting a composition and quantitative ratio of the components of an extraction scheme and process conditions according to the composition of solutions to be processed.

The compactness of the technological scheme of the methods according to the invention allows one to use a technology of extraction of radionuclides, in particular, strontium and cesium, both in chamber and in canyon versions of arrangement of the equipment.

The invention claimed is:

1. A method of diluting solutions containing macrocyclic compounds, comprising the step of:

providing a solution containing one or more macrocyclic compounds selected from (i) crown ethers having unsubstituted aromatic fragments; (ii) crown ethers having substituted aromatic fragments containing alkyl and/or hydroxyalkyl substituents of a linear and/or ramified structure; (iii) crown ethers having unsubstituted cyclohexane fragments; (iv) crown ethers having substituted cyclohexane fragments containing alkyl and/or hydroxyalkyl substituents of a linear and/or ramified structure; or (v) crown ethers having substituted fragments —O—CHR—CH$_2$O—, where R is the normal or ramified alkyl or hydroxyalkyl; and adding a mixture comprising:
(1) a polyfluorinated alcohol-telomer 1,1,7-trihydrododecafluoroheptanol-1 of the formula H(CF$_2$CF$_2$)$_3$CH$_2$OH, and
(2) a mixture of polyoxyethyleneglycol ethers of synthetic primary higher fatty alcohols of fraction C$_{12}$-C$_{14}$ of the general formula C$_n$H$_{2n+1}$O(C$_2$H$_4$O)$_2$H, where n=12 to 14.

2. A composition for extracting radionuclides from acidic water solutions of high-active waste of radiochemical production comprising (a) one or more macrocyclic compounds selected from: (i) crown ethers having unsubstituted aromatic fragments; (ii) crown ethers having substituted aromatic fragments containing alkyl and/or hydroxyalkyl substituents of a linear and/or ramified structure; (iii) crown ethers having unsubstituted cyclohexane fragments; (iv) crown ethers having substituted cyclohexane fragments containing alkyl and/or hydroxyalkyl substituents of a linear and/or ramified structure; or (v) crown ethers having substituted fragments —O—CHR—CH$_2$O—, where R is the normal or ramified alkyl or hydroxyalkyl, and (b) an organic solvent, wherein said organic solvent comprises-(i) a polyfluorinated alcohol-telomer 1,1,7-trihydrododecafluoroheptanol-1 and (ii) a mixture of polyoxyethyleneglycol ethers of synthetic primary higher fatty alcohols of fraction C$_{12}$-C$_{14}$ of the general formula C$_n$H$_{2n+1}$O(C$_2$H$_4$O)$_2$H, where n=12 to 14.

3. The composition according to claim 2, wherein the polyfluorinated alcohol-telomer 1,1,7-trihydrododecafluoroheptanol-1 is present in a range of 80-99 vol. %, and the mixture of polyoxyethyleneglycol ether of synthetic primary higher fatty alcohols of fraction C$_{12}$-C$_{14}$ is present in a range of from 20-1 vol. %.

4. A composition for extracting cesium radionuclides from acidic water solutions of high-active waste of radiochemical production, comprising (a) one or more crown ethers selected from: (i) di-tert-butyldibenzo-18-crown-6 (DTBDB18C6), (ii) di-isooktylbenzo-18-crown-6 (DIODB18C6), (iii) dibenzo-21-crown-7 (DB21C7), or (iv) bis-4,4'(5')[1-hydroxy-2-ethylhexyl]benzo-18-crown-6 (Crown XVII), and (b) an organic solvent, wherein said organic solvent comprises (i) 80-99 vol. % of a polyfluorinated alcohol-telomer 1,1,7-trihydrododecafluoroheptanol-1 and (ii) 20-1 vol. % of a mixture of polyoxyethyleneglycol ethers of synthetic primary higher fatty alcohols of fraction C$_{12}$-C$_{14}$ of the general formula C$_n$H$_{2n+1}$O(C2H4O)$_2$ H, where n=12 to 14, wherein the acidic water solution comprises cesium cations and other macropollutants.

5. The composition according to claim 4, wherein the crown ether of dibenzo-21-crown-7 (DB21C7) is present in a range of 0.04 mole/l to 0.095 mole/l of the composition.

6. A composition for extracting strontium radionuclides from acidic water solutions of high-active waste of radiochemical production comprising
   (a) one or more crown ethers selected from: (i) di-tert-butyldicyclohexane-18-crown-6 (DTBDCH18C6), (ii) di-isooctyldicyclohexane-18-crown-6 (DIODCH18C6), (iii) dicyclohexane-18-crown-6 (DCH18C6), or (iv) bis-4,4'(5')[1-hydroxyheptyl]dicyclohexane-18-crown-6 (Crown XVI), and
   (b) an organic solvent, wherein said organic solvent comprises (i) 80-99 vol. % of a polyfluorinated alcohol-telomer 1,1,7-trihydrododecafluoroheptanol-1 and (ii) 20-1 vol. % of a mixture of polyoxyethyleneglycol ethers of synthetic primary higher fatty alcohols of fraction $C_{12}$-$C_{14}$ of the general formula $C_nH_{2n+1}O(C_2H_4O)_2H$, where n=12 to 14,
   wherein the acidic water solution comprises strontium cations and other macropollutants.

7. The composition according to claim 6, wherein the dicyclohexane-18-crown-6 is present in a concentration of 0.04 mole/l to 0.095 mole/l of the composition.

8. A composition for extracting of strontium and cesium radionuclides from acidic water solutions of high-active waste of radiochemical production, comprising
   (a) a mixture of crown ethers, in which
      (i) at least one crown ether is selected from: di-tert-butyldibenzo-18-crown-6 (DTBDB18C6), di-isooktylbenzo-18-crown-6 (DIODB18C6), dibenzo-21-crown-7 (DB21C7), or bis-4,4'(5')[1-hydroxy-2-ethylhexyl]benzo-18-crown-6 (Crown XVII), and
      (ii) at least one crown ether is selected from: di-tert-butyldicyclohexane-18-crown-6 (DTBDCH18C6), di-isooctyldicyclohexane-18-crown-6 (DIODCH18C6), dicyclohexane-18-crown-6 (DCH18C6), or bis-4,4'(5')[1-hydroxyheptyl]dicyclohexane-18-crown-6 (Crown XVI), and
   (b) an organic solvent comprising (i) 80-99 vol. % of a polyfluorinated alcohol-telomer 1,1,7-trihydrododecafluoroheptanol-1 and (ii) 20-1 vol. % of a mixture of polyoxyethyleneglycol ether of synthetic primary higher fatty alcohols of the fraction $C_{12}$-$C_{14}$ of the general formula $C_nH_{2n+1}O(C_2H_4O)_2H$, where n=12 to 14
   wherein the acidic water solution comprises cesium and strontium cations and other macropollutants.

9. The composition according to claim 8, wherein the organic solvent has about 87 vol. % of the polyfluorinated alcohol-telomer 1,1,7-trihydrododecafluoro-heptanol-1, and about 13 vol. % of the mixture of polyoxyethyleneglycol ether of synthetic primary higher fatty alcohols of fraction $C_{12}$-$C_{14}$.

10. The composition according to claim 9, wherein the mixture of crown ethers comprises dicyclohexy-18-crown-6 and dibenzo-21-crown-7, each having a concentration in a range of 0.04 mole/l to 0.095 mole/l of the composition.

11. A method of recovery of a spent extractant comprising treating the spent extractant with a water solution of potassium ethylenediaminetetra acetate at pH of 8.0 to 9.0
   wherein the spent extractant comprises complexes of macrocyclic compounds selected from: crown ethers having unsubstituted aromatic fragments; crown ethers having substituted aromatic fragments containing alkyl and/or hydroxyalkyl substituents of a linear and/or ramified structure; crown ethers having unsubstituted cyclohexane fragments; crown ether having substituted cyclohexane fragments containing alkyl and/or hydroxyalkyl substituents of a linear and/or ramified structure; crown ethers having substituted fragments —O—CHR—CH$_2$O—, where R is the normal or ramified alkyl or hydroxyalkyl with extractable cations of radionuclides; and
   an organic solvent comprising 80-99 vol. % of a polyfluorinated alcohol-telomer 1,1,7-trihydrododecafluoroheptanol-1 and 20-1 vol. % a mixture of polyoxyethylene glycol ether of synthetic primary higher fatty alcohols of the fraction $C_{12}$-$C_{14}$ of the general formula $C_nH_{2n+1}O(C_2H_4O)_2H$, where n=12 to 14.

12. A method of recovery according to claim 11, wherein the concentration of potassium ethylenediaminetetraacetate in said water solution is in a range of 0.02 mole/l to 0.03 mole/l.

13. A method of recovery according to claim 11, wherein the pH is maintained by adding potassium hydroxide.

14. A method of extracting radionuclides from an acidic water solution of high-active waste of radiochemical production comprising the steps of,
   treating the waste water solution with an extractant comprising one or more macrocyclic compounds and an organic solvent, wherein the macrocyclic compound is capable of binding ions of radionuclides to form an extract,
   removing the extract from the waste water solution, and
   re-extracting the radionuclides from the extract by deionized water,
   wherein the macrocyclic compound is selected from the group consisting of: (i) crown ethers having unsubstituted aromatic fragments; (ii) crown ethers having substituted aromatic fragments containing alkyl and/or hydroxyalkyl substituents of a linear and/or ramified structure; (iii) crown ethers having unsubstituted cyclohexane fragments; (iv) crown ethers having substituted cyclohexane fragments containing alkyl and/or hydroxyalkyl substituents of a linear and/or ramified structure; and (v) crown ethers having substituted fragments —O—CHR—CH$_2$O—, where R is the normal or ramified alkyl or hydroxyalkyl, and
   wherein the organic solvent comprises a polyfluorinated alcohol-telomer-1,1,7-trihydrododecafluoroheptanol-1 and a mixture of polyoxyethyleneglycol ether of synthetic primary higher fatty alcohols of fraction $C_{12}$-$C_{14}$ of the general formula $C_nH_{2n+1}O(C_2H_4O)_2H$, where n=12-14.

15. A method according to claim 14, wherein the organic solvent has a polyfluorinated alcohol-telomer 1,1,7-trihydrododecafluoroheptanol-1 in a range of 80-99 vol. %, and a mixture of polyoxyethyleneglycol ether of synthetic primary higher fatty alcohols of fraction $C_{12}$-$C_{14}$ in a range of 20-1 vol. %.

16. A method of extracting cesium radionuclides from acidic water solutions of high-active waste of radiochemical production comprising the steps of
   treating the waste water solution with an extractant comprising at least one macrocyclic compound and an organic solvent, wherein the macrocyclic compound is capable of binding ions of cesium radionuclides to form an extract,
   removing the extract from the waste water solution, and
   re-extracting the cesium radionuclides from the extract by deionized water,
   wherein the macrocyclic compound is a crown ether selected from a group consisting of:
   di-tert-butyldibenzo-18-crown-6 (DTBDB18C6),
   di-isooktylbenzo-18-crown-6 (DIODB18C6), dibenzo-21-crown-7 (DB21C7), and
bis-4,4'(5')[1-hydroxy-2-ethylhexyl]benzo-18-crown-6 (Crown XVII),
wherein the organic solvent comprises 80-99 vol. % of a polyfluorinated alcohol-telomer 1,1,7-trihydrododecafluoroheptanol-1 and 20-1 vol. % of a mixture of polyoxyethyleneglycol ether of synthetic primary higher fatty alcohols of fraction $C_{12}$-$C_{14}$ of the general formula $C_nH_{2n+1}O(C_2H_4O)_2H$, where n=12-14 and
wherein the acidic water solution comprises cesium cations and other macropollutants.

17. A method according to claim 16, wherein the extractant comprises a crown ether of dibenzo-21-crown-7 (DB21C7) in a concentration of 0.04 mole/l to 0.095 mole/l of the extractant.

18. A method of extracting strontium radionuclides from acidic water solutions of high-active waste of radiochemical production comprising the steps of
treating the waste water solution with an extractant comprising at least one macrocyclic compound and an organic solvent, wherein the macrocyclic compound is capable of binding ions of strontium radionuclides to form an extract,
removing the extract from the waste water solution, and
re-extracting the strontium radionuclides from the extract by deionized water, wherein the macrocyclic compound is a crown ether selected from a group consisting of:
di-tert-butyldicyclohexane-18-crown-6 (DTBDCH18C6),
di-isooctyldicyclohexane-18-crown-6 (DIODCH18C6),
dicyclohexane-18-crown-6 (DCH18C6), and
bis-4,4'(5')[1-hydroxyheptyl]dicyclohexane-18-crown-6 (Crown XVI),
wherein the organic solvent comprises 80-99 vol. % of a polyfluorinated alcohol-telomer 1,1,7-trihydrododecafluoroheptanol-1 and 20-1 vol. % of a mixture of polyoxyethyleneglycol ether of synthetic primary higher fatty alcohols of fraction $C_{12}$-$C_{14}$ of the general formula $C_nH_{2n+1}O(C_2H_4O)_2H$, where n=12-14 and
wherein the acidic water solution comprises strontium cations and other macropollutants.

19. A method according to claim 18, wherein the extractant comprises dicyclohexane-18-crown-6 in a range of concentration of 0.04 mole/l to 0.095 mole/l of the extractant.

20. A method of extracting cesium and strontium radionuclides from acidic water solutions of high-active waste of radiochemical production comprising the steps of
treating the waste water solution with an extractant, said extractant comprising macrocyclic compounds and an organic solvent, wherein the macrocyclic compound is capable of binding ions of cesium and strontium radionuclides to form an extract,
removing the extract from the waste water solution,
re-extracting the cesium and strontium radionuclides from the extract by deionized water,
wherein the macrocyclic compounds comprise a mixture of crown ethers, in which at least one crown ether is selected from:
di-tert-butyldibenzo-18-crown-6 (DTBDB18C6),
di-isooktylbenzo-18-crown-6 (DIODB18C6),
dibenzo-21-crown-7 (DB21C7), or
bis-4,4'(5')[1-hydroxy-2-ethylhexyl]benzo-18-crown-6 (Crown XVII),
and at least one crown ether is selected from:
di-tert-butyldicyclohexane-18-crown-6 (DTBDCH18C6),
di-isooctyldicyclohexane-18-crown-6 (DIODCH18C6),
dicyclohexane-18-crown-6 (DCH18C6),
bis-4,4'(5')[1-hydroxyheptyl]dicyclohexane-18-crown-6 (Crown XVI), and
wherein the organic solvent comprises 80-99 vol. % of a polyfluorinated alcohol-telomer 1,1,7-trihydrododecafluoroheptanol-1 and 20-1 vol. % of a mixture of polyoxyethyleneglycol ether of synthetic primary higher fatty alcohols of fraction $C_{12}$-$C_{14}$ of the general formula $C_nH_{2n+1}O(C_2H_4O)_2H$, where n=12-14 and
wherein the acidic water solution comprises cesium cations, strontium cations and other macropollutants.

21. A method according to claim 20, the organic solvent has a polyfluorinated alcohol-telomer 1,1,7-trihydrododecafluoroheptanol-1 of concentration 87 vol. %, a mixture of polyoxyethyleneglycol ether of synthetic primary higher fatty alcohols of fraction $C_{12}$-$C_{14}$ in a concentration of 13 vol. %.

22. A method according to claim 20, wherein the extractant comprises a mixture of dicyclohexane-18-crown-6 and dibenzo-21-crown-7, each present at a range of concentration of 0.04 mole/l to 0.095 mole/l of the extractant.

23. A method according to claim 11, further comprising treating the spent extract with a water solution of potassium ethylenediaminetetraacetate at pH of 8.0 to 9.0.

24. A method according to claim 23, wherein the concentration of the potassium ethylenediaminetetraacetate in a water solution is selected in a range of 0.02 mole/l to 0.03 mole/l.

25. A method according to claim 23, wherein the water solution pH is maintained by adding potassium hydroxide.

26. A method according to, claim 16, wherein the extraction is carried out in a dynamic counter-current regime.

27. A method according to claim 18, wherein the extraction is carried out in a dynamic counter-current regime.

28. A method according to claim 20, wherein the extraction is carried out in a dynamic counter-current regime.

* * * * *